Aug. 18, 1942.    F. D. TERPENING    2,293,416
MAP MAKING METHOD AND TEMPLET FOR SAME
Filed June 12, 1940    2 Sheets-Sheet 1

INVENTOR
FRANK D. TERPENING
BY
HARRIS, KIECH, FOSTER & HARRIS
FOR THE FIRM
ATTORNEYS.

Aug. 18, 1942.　　　F, D. TERPENING　　　2,293,416
MAP MAKING METHOD AND TEMPLET FOR SAME
Filed June 12, 1940　　　2 Sheets-Sheet 2
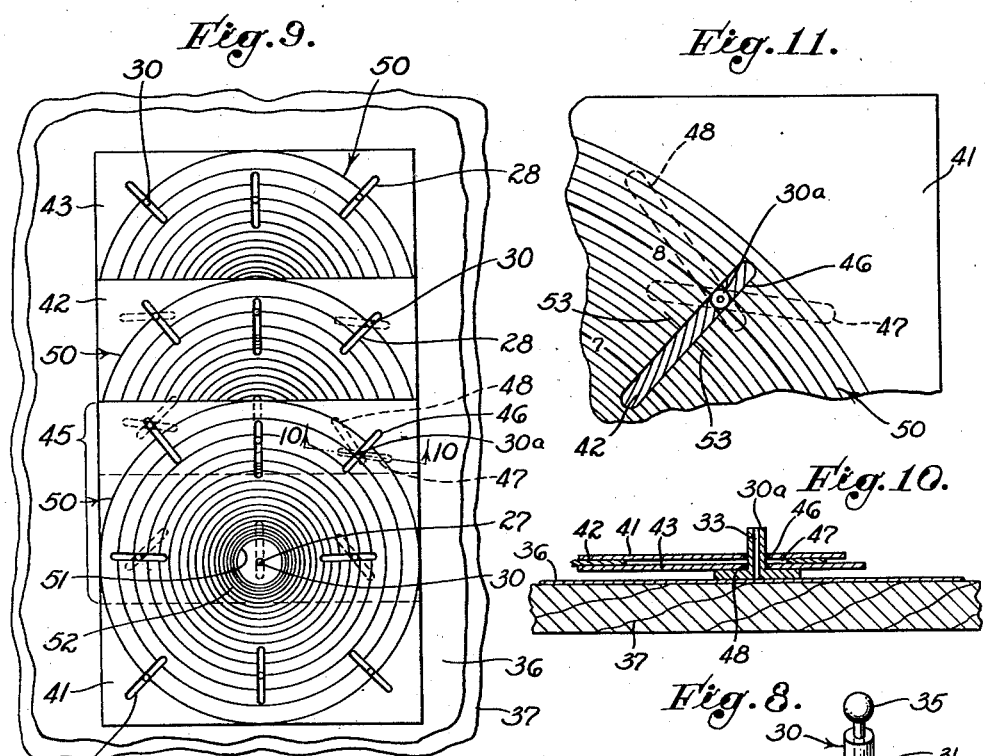
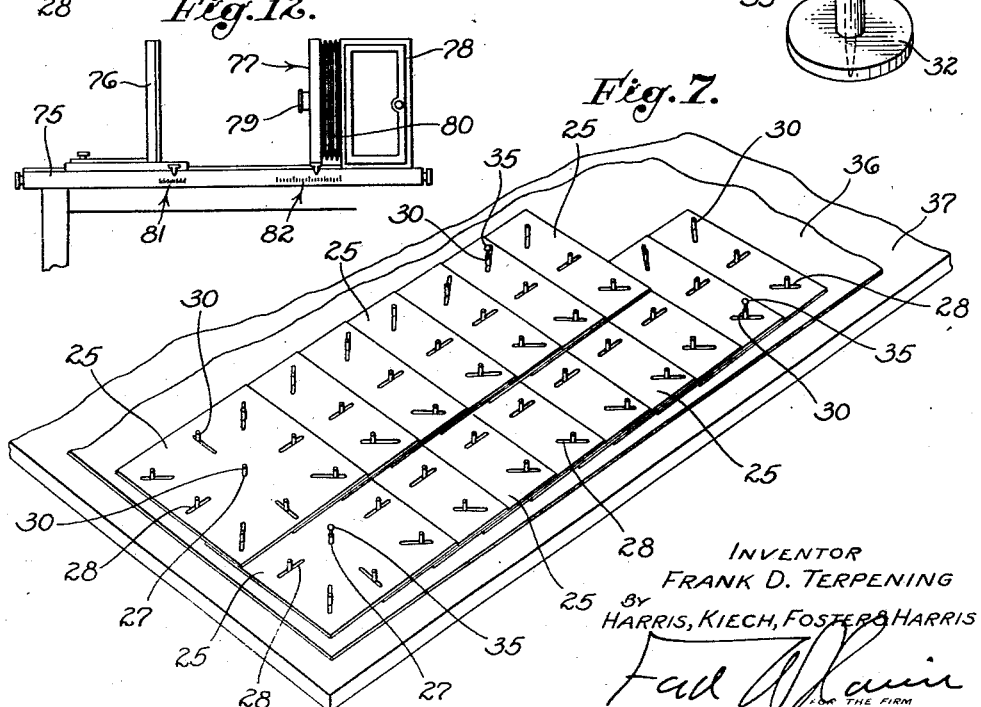
INVENTOR
FRANK D. TERPENING
BY
HARRIS, KIECH, FOSTER & HARRIS
ATTORNEYS.

Patented Aug. 18, 1942

2,293,416

UNITED STATES PATENT OFFICE 2,293,416

MAP MAKING METHOD AND TEMPLET FOR SAME

Frank D. Terpening, Los Angeles, Calif., assignor to Fairchild, Polley & Eliel, Inc., Los Angeles, Calif., a corporation of California Application June 12, 1940, Serial No. 340,085

6 Claims. (Cl. 33—1)

My invention relates to the art of deriving maps from aerial photographs, with special reference to such methods involving the use of interlocked templets and is directed specifically to a new and improved templet procedure.

The basic mapping method of which the present invention is an improvement is set forth in the Collier Patent No. 2,102,612 and the Eliel et al. Patent No. 2,180,406, which two patents may be taken as part of the present disclosure.

In the procedure taught by the two patents, consecutive overlapping templets corresponding to consecutive overlapping photographs of terrain are assembled on a suitable working or map surface. Each of the templets has a central aperture representing the reference center or optical center of the corresponding photograph and has slots disposed radially thereof representing radial lines through reference points corresponding to clearly recognizable reference points appearing on the corresponding photograph. The overlapping templets are interlocked by mechanical means such as slidable posts passing through the intersecting slots, the interlocking relationships being such that the positions of the posts, as determined automatically by the intersecting slots, correspond to the correct positions of the map points on a scale that is determined by the adjustment of the templet assembly. When the templet assembly is adjusted to a desired scale, the map points located by mechanical triangulation in the above described manner are more often than not at variance with the original locations of the reference points as spaced on the original photographs. It then becomes desirable in most practices of the basic procedure to enlarge or reduce the original photographs to compensate for the discrepancies in the locations of the reference points as revealed by the automatic triangulation, the object being to achieve a revised set of photographs so scaled as to show the various reference points at the precise locations determined by the templet assembly. In the usual procedure as described in the above-mentioned patents, a reference sheet is placed on the supporting surface under the templet assembly and the locations of the various reference points are marked on the reference sheet at the locations indicated by the templet assembly and then the original photographs are checked against the spacings of reference points on the reference paper to ascertain to precisely what degree the photographs should be enlarged or reduced for correction.

The general object of my invention is to reduce the number of steps of the above described basic procedure and to reduce the possibilities for error in the procedure. My invention relates primarily to the steps following the assembly of the templets to the desired scale, i. e., the steps that are taken to achieve a final set of photographs at such scale. It is my purpose to shorten this latter portion of the procedure and to increase accuracy by a new method of deriving the correction factors for the various photographs.

Characterizing my invention is the concept that scales may be imprinted or otherwise provided on the individual templets for visual comparative measurements leading directly to the required correction factors. One of my specific objects in this aspect of the invention is to provide a simple and efficient scale for the suggested purpose. Another specific object in mind is to provide a means for slotting and marking a templet to facilitate the use of the imprinted scale.

A further object of the invention is to expedite and simplify the map making procedure by providing a combination of ratio camera and scaled templets in which the camera has a scale functionally related to the templet scales. A feature of the invention in this aspect is the concept of using logarithmic scales on both the templet and ratio camera for reducing the required correction computation to simple substraction of visually ascertained scale values.

The above and other objects and advantages of my invention will be apparent in the following detailed description, considered with the accompanying drawings.

In the drawings which are to be taken as illustrative only:

Fig. 7 is a fragmentary perspective view on a somewhat reduced scale of a templet assembly on a supporting surface;

Fig. 8 is a perspective view of one of the conjoining posts employed to interlock the templets in the assembly of Fig. 7;

Fig. 9 is a plan view of three of the interlocked templets on a larger scale;

Fig. 10 is a fragmentary view on a still larger scale taken as indicated by the line 10—10 of Fig. 9;

Fig. 11 is a fragmentary plan view corresponding to Fig. 10; and

Fig. 12 is a side elevation of a camera device for reproducing the photographs at corrected scales.

In the usual map making procedure by aerial methods, an airplane carrying a camera is flown back and forth along adjacent and parallel lines over terrain to be mapped and consecutive photographs of the terrain are taken in such sequence that one photograph overlaps the preceding photograph by more than 50%, preferably about 60%. The camera is provided with means for indicating the center point of each photograph as a reference center for subsequent triangulation. Severally outlying clearly recognizable points on each photograph are selected for the purpose of coordinating overlapping photographs by triangulation. If all of the photographs are to the same scale and are disposed in correct overlapping relation with lines radiating from the reference centers of the photographs to the selected outlying reference points, each reference point will be common to a plurality of photographs and will lie at the intersection of the corresponding radial lines of the overlapping photographs. In practice the initial photographs are never uniform in scale because the most skillful pilot cannot maintain a desired elevation relative to varying terrain. One purpose of using interlocking templets to represent the photographs is to ascertain variations in scale of the photographs so that reproductions of the photographs may be made to uniform scale.

An understanding of the present invention may be approached advantageously by first reviewing the standard procedure that has heretofore prevailed. Part of the present drawings may be of assistance in this review if circular scales appearing on the templets are disregarded.

Figure 1:
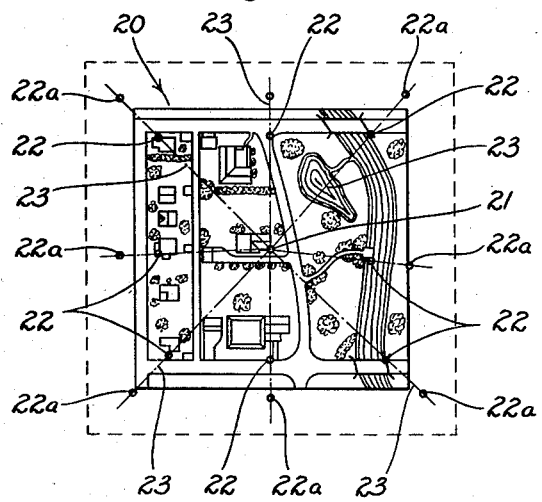
Fig. 1 is a view of an aerial photograph taken by an aerial mapping camera.

Fig. 1 shows a typical photograph 20 on which the reference center 21 is indicated, this center point being hereinafter termed the "reference center." A number of selected outlying points that are clearly recognizable in the photographic image are indicated thereon by dots 22. The drawings show corresponding lines 23 from the reference center 21 to the dots 22 to indicate the radial dispositions of the dots, but such lines are usually not actually drawn on the photographs.

Figure 2:
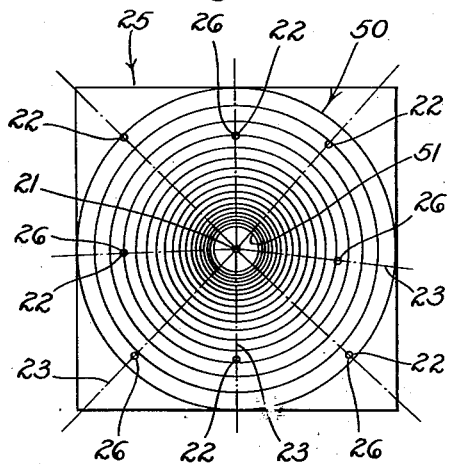
Fig. 2 shows one of my novel templets in the process of preparation.

Fig. 2 shows at an early stage of development a templet 25 representing the photograph 20, the templet being marked with the reference center 21 and the various outlying reference points 22 of the photograph. The various points may be plotted on the templet 25 by the simple procedure of placing the photograph 20 over the templet and piercing both the photograph and templet with a needle-like instrument at the indicated points. To make the various points on the templet conspicuous and thereby reduce the likelihood of error, I prefer to mark circles 26 around each of the outlying reference points 22.

Figure 3:
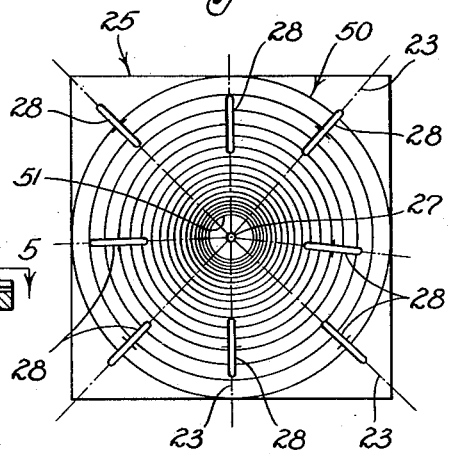
Fig. 3 shows the templet after it has been punched and slotted.

After the templet is marked in the manner described, a hole 27 is punched concentric with the reference center 21, as shown in Fig. 3, and some suitable device having centering means cooperative with the hole 27 is employed to cut radial slots 28 in the templet to indicate the locations and the radial dispositions of the various outlying reference points 22. The drawings show in Figs. 2 and 3 the previously mentioned radial lines 23 to emphasize the fact that the slots are in accurate radial disposition, but in practice such radiating lines are not required.

The next step in the old procedure is to assemble the slots in overlapping disposition on a suitable work surface with the templets interlocked into a coordinated assembly by a number of templet posts such as the templet post 30 in Fig. 8. Such a templet post has an upright cylindrical stem 31 of a diameter to slidingly fit the templet slots and has a wide base portion 32 on which the post may slide over a supporting surface. The post has an axial bore 33 through which the position of the post may be marked on the underlying surface or through which an anchoring pin 35 may be inserted, as shown in Fig. 10.

Fig. 7 shows a number of overlapping templets 25 interlocked by various templet posts 30 that engage the various central holes 27 and radial slots 28 of the templets. In Fig. 7 the assembly rests upon what may be termed a "reference sheet" or "mapping sheet" 36 which is spread on a work table 37. Within rather liberal limits permitted by the slots 28 the assembly of templets may be expanded and contracted in a coordinated manner, the relative spacing of the posts 30 increasing and decreasing accordingly and the posts causing each of the templets to move for maintenance of the correct position of the templet relative to the assembly as a whole. In the particular templet assembly shown in Fig. 7, three of the pins 35 anchor three of the templet posts 30 at predetermined points on the reference sheet 36 and thereby fix the longitudinal extension of the templet assembly in accord with the scale represented by the three predetermined points.

The manner in which the templets interlock is best shown by the three templets 41, 42, and 43 in Figs. 9, 10, and 11. Each of the three templets 41, 42, and 43 is shown with the usual center hole 27 and radial slots 28 so that the templets may be interlocked by employing the required number of templet posts 30. It will be obvious in Fig. 9 that the uppermost templet 41 has a marginal portion 45 that overlies a central portion of the intermediate templet 42 and also overlies a marginal portion of the undermost templet 43. In an assembly of numerous templets, each of the posts, with a few exceptions along the margin of the assembly, will extend through at least three of the templets. Figs. 9, 10, and 11 show a post 30a extending through a slot 46 in the uppermost templet 41, a slot 47 in the intermediate templet 42, and a slot 48 in the lowermost templet 43.

The longitudinal center of the uppermost slot 46 is the location of the corresponding reference point 22 that was plotted on the templet prior to the slot-cutting operation. It is to be noted, however, as best shown in Fig. 11, that the post 30a is shifted outwardly from the longitudinal center of the slot. The final position of the post 30a may be called the "triangular determination" or the "corrected location" for the original reference point for which the slot is cut. The outward shift of the post 30a as caused by cam action on the part of the three associated slots in the process of assembling and adjusting the templet assembly indicates that the original photograph on which the templet is based must be enlarged to conform with the scale of the templet assembly. Such enlargement of a photograph, of course, in effect causes all of the outlying reference points to shift radially outward. Fig. 1, for example, indicates in dotted lines how the photograph 20 may be enlarged to cause the reference points 22 in effect to move outward to positions 22a.

In the older practice under the two previously mentioned patents, the procedure after the templets are properly assembled is as follows. Pins such as the anchoring pins 35 are inserted through the axial bores 33 of the various templet posts 30 to prick the underlying reference sheet, thereby marking on the reference sheet the correct locations of all of the reference points 22. Legends or symbols are then marked on the reference sheet to identify the various reference points, which reference points of course include the reference centers of the various templets. The templet assembly is then removed from the reference sheet and comparison is made between each of the photographs represented by the templets and the locations of the corresponding points on the reference sheet. The comparison is made by measuring on the reference sheet the distance between a reference center and an associated outlying reference point and then measuring on the corresponding photograph the corresponding spacing between the reference center and the outlying reference point. The spacing derived from the reference sheet is then divided by the spacing taken from the original photograph to arrive at a ratio or correction factor for guidance in reproduction of the photograph by enlargement or reduction to the required scale.

The improvement represented by the present invention is primarily in the provision of a circular scale for each of the templets and in the saving of time and the increasing of accuracy achieved by the addition of the templet scale. Since the purpose of the scale is to facilitate the comparison of distances from the templet center, the scale may express any units of measurement, for example, inches or centimeters. A feature of my invention, however, is that outstanding advantages may be had by using a scale to indicate the logarithms of spacing values, the scale, for example, indicating the logarithms of distances in inches. Since measurements along only one radial line of the many available on a templet are necessary to reach a correction factor for the photograph, the scale may be confined to substantially one radial direction, but I prefer to use full circles for the graduations to produce a concentric scale that may be employed to ascertain radial measurements on the face of the templets in any radial direction.

In the particular arrangement suggested by the drawings, each of the templets is imprinted with a circular scale generally designated 50. The innermost circle 51 (Fig. 9) has a radius of exactly one inch and has a scale value of zero since the logarithm of 1 is zero. The fifth circle 52 from the center having the scale value 1 is at approximately an inch and a quarter from the center, since the log 0.1000 will represent approximately 1.259 inches.

Referring to Fig. 11, it is apparent that since the radial slot 28 is punched symmetrical to the location of the corresponding reference center 21 that was originally marked on the templet, the comparison to be made for the purpose of ascertaining the correction factor of the corresponding photograph is the comparison between the radial distance of the geometrical center of the slot from the reference center of the templet and the radial distance of the axis of the post 30a from the reference center of the templet. In the preferred practice of my invention, I provide index means associated with each of the radial slots 28 to indicate at a glance the radial distance of the slot center for measurment on the circular scale 50. Thus, as shown in Fig. 11, I may impress or imprint index marks 53 on the templet at the sides of the slots to indicate the locations of the centers of the slots.

Figure 4:
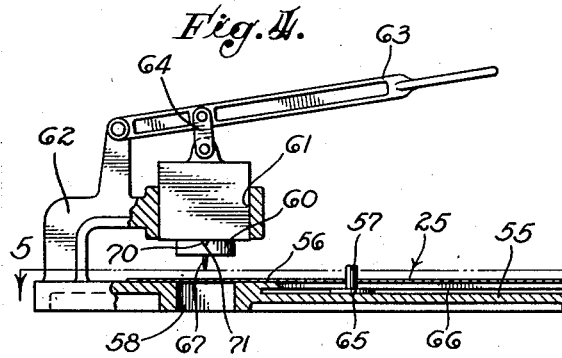
Fig. 4 is a partly sectioned elevational view showing a device for slotting the templet with a templet thereon in position for slotting.
Figure 5:
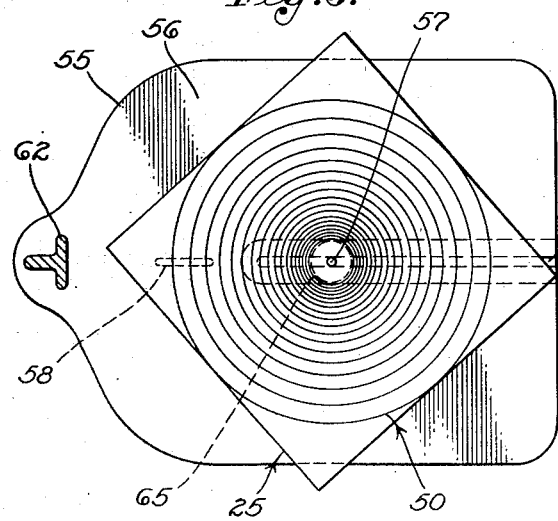
Fig. 5 is a sectional plan view taken as indicated by the line 5—5 of Fig. 4.
Figure 6:
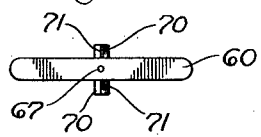
Fig. 6 is a bottom plan view of a combined punch and marker employed in the device shown in Fig. 4.

To provide the index marks 53 for the slots 28 without adding a step to the usual procedure for marking and punching the templets, I contemplate using a special slot-cutting device constructed as indicated by Figs. 4, 5, and 6. The slot-cutting device or templet punch includes a base 55 providing a work-support surface 56 and equipped with a suitable pin or post 57 for entering with fairly close fit the aforementioned central reference hole 27 in a templet 25. The cutting means proper includes a die opening 58 in the base 55 and a complementary punch member 60 that is slidingly retained by guide walls 61 formed in an arm 62 that is mounted on the base to overhang the die opening. The cutting movements of the punch member 60 are governed by an operating handle 63 that is connected to the punch member 60 by a suitable link 64.

Since it is necessary to provide for varying at will the distance of the individual slots from the templet reference center 21, which reference center is represented by the central hole 27, it is necessary to provide for relative movement between the slot-cutting means and the post 57. In the particular construction shown in the drawings, the required adjustability is achieved simply by mounting the post 57 in a movable manner on the base 55. For example, the post may be provided with a base flange 65 and slidingly mounted in a complementary guide slot 66, the slot having the cross-sectional configuration of an inverted T. It will be noted by an inspection of Fig. 5 that the longitudinal axis of the cutting pattern, in other words the long axis of the die opening 58 or the long axis of the punch member 60 in cross section, is in radial alignment to the axis of the post 57, and that the longitudinal axis of the guide slot 66 coincides with such radial alignment. Means to insure cutting the radial slots accurately symmetrical to the various outlying reference points 22 of the templets may comprise a needle-like member 67 extending downwardly from the cutting face of the punch member 60.

The slot-cutting device described to this point is one form of slotting device that has heretofore been commonly used in the practice of the methods disclosed by the aforementioned two patents. My contribution to facilitate the practice of the present invention consists of adding means to the slot-cutting device to apply index means such as the index marks 53 to the templets simultaneously with the punching of the templet slots. For example, I may add die members or suitable lateral projections 70 to the punch member 60 to impress the material of the templet adjacent the slots when the slots are cut. The lateral projections 70 are spaced above the cutting face of the punch member 60 so that after the punch member shears away the material of a templet to form a radial slot, continued downward movement of the punch member causes suitably sharp edges 71 of the projections to compress the material of the templet against the work-support 56 of the base 55, thereby creasing the templet to form the index marks 53.

Turning again to Fig. 11 for illustration of the new procedure, it is apparent that the operator may note at a glance the two values necessary for computing the correction factor for the corresponding photograph. The operator notes the log 0.802 for the position of the axis of the post 30a and the log 0.762 for the index marks 53. Subtracting log 0.762 from log 0.802 the operator obtains the log 0.040 representing the ratio between the two radial distances which is the correction factor for the corresponding photograph. Expressed in inches the actual radial distance of the post 30a is 6.339" and the actual radial distance of the index mark 53 is 5.781". While these measurements of inches are expressed in thousands because they are derived from the logs 0.802 and 0.762 it is apparent, of course, that since the log values are based on mere inspection and visual comparison with the log scale 59, accuracy to the thousandth of an inch is not actually obtainable. The values derived by the described visual procedure are, however, sufficiently close to correct values to result in map work of the required degree of accuracy. The log 0.040 indicates that the correction factor is 1.096, and that a photograph to the correct scale may be obtained by enlarging the corresponding original photograph to increase its dimensions by .096%.

The actual number expressing the correction factor may be derived from the difference in the log readings by reference to a table of logarithms so that a ratio camera or enlarging printer with a conventional ratio scale may be employed to produce the corrected photograph. A feature of the preferred practice of my invention, however, is the further conception that any necessity for translating log values into corresponding numbers may be entirely avoided by employing a ratio camera or enlarging printer with a ratio scale expressed in logarithms.

Fig. 12 shows a ratio camera or printer comprising a base 75, an easel 76 movably mounted on the base, and an adjustable projector generally designated 77. Included in the adjustable projector is a film holder 78, a lens 79 and a bellows 80 extending from the film holder to the lens. A negative film being in the film holder 78, light from a suitable source (not shown) at the rear of the film passes through the lens 79 to project an image of the film pattern on the easel 76, the ratio of the image dimensions to the dimensions of the film pattern being determined by the adjustment of the easel and the projector. The scale for the printer is in fact two scales with indentical readings, a scale 81 for adjustment of the easel 76 and a scale 82 for adjustment of the projector 77. Both scales are in logarithms of correction factors, the zero point for each scale representing the adjustment of the printer that corresponds to the size of the original aerial photographs.

In recapitulation, the advantages of the practice afforded by my invention may be emphasized by comparing the steps in the new procedure with the steps followed in the older procedure of the previously mentioned patents.

The steps of the old procedure are:
1. Marking selected map points on the series of original photographs.
2. Plotting the reference centers of the photographs and the selected map points or outlying reference points on a series of templets corresponding to the series of the photographs.
3. Punching radial slots in the templets symmetrical to each of the selected reference points.
4. Interlocking the series of related templets on a work surface and adjusting the templets to a required scale by anchoring selected posts at predetermined points on the map surface.
5. Plotting and identifying the positions of the interlocking posts of the templet assembly on a reference sheet under the map assembly.
6. Measuring on the reference sheet the distance from the reference center of each templet to a selected one of the outlying reference points of the templet area on the reference sheet.
7. Measuring on each of the original photographs the corresponding distance from the reference center to the selected outlying reference point.
8. For each photograph dividing the radial distance derived from the reference sheet by the corresponding radial distance obtained by measurement on the photograph to obtain a correction factor.
9. For each original photograph setting a ratio camera or enlarging printer to the required correction factor and making a new print of the photograph.

The steps of the present method are:
1. Marking selected map points on the series of original photographs.
2. Plotting the reference centers of the photographs and the selected map points or outlying reference points on a series of templets corresponding to the series of the photographs.
3. Punching radial slots in the templets symmetrical to each of the selected reference points, and simultaneously marking indices on the templets to indicate the longitudinal centers of the slot.
4. Interlocking the series of related templets on a work surface and adjusting the templets to a required scale by anchoring selected posts at predetermined points on the map surface.
5. Noting by inspection of the templet assembly the value on the log scale of each templet indicated by the position of a selected templet post representing an outlying reference point.
6. Noting by inspection the value on the log scale of each templet indicated by the corresponding index marks 53 at the slot through which the selected templet post extends.
7. Subtracting the logarithm of step 6 from the logarithm of step 5 for each templet to ascertain the logarithm of the correction factor for the corresponding photograph.
8. For each original photograph, setting the ratio camera or enlarging printer to the logarithm derived in step 7 and making a new print of the photograph.

The fact that the new method has eight steps instead of the nine steps of the old method is only one of the advantages apparent in the above comparison. One of the additional advantages is that the use of a reference sheet under the map assembly for arriving at the correction factors is eliminated. Another advantage is that the values are obtained without the manual application of any ruling devices whatsoever. A further consideration is that in carrying out the old procedure, care must be taken to pair the measurements on the reference sheet with the corresponding measurements on the photographs, whereas in the new procedure the two values that must be paired for comparison are read consecutively in the same radial direction on the same templet. A still further advantage is that the computations for each photograph are reduced to merely the subtraction of one log from another. It is apparent that the procedure is inherently accurate and involves fewer chances for error than the older procedure.

The preferred form of templet and the preferred procedure in the practice of my invention described herein, for the purpose of disclosure and to illustrate the principles involved, will suggest to those skilled in the art various changes and modifications both in the templet and in the procedure; it is to be understood that I reserve the right to all such changes and modifications that properly come within the scope of my appended claims.

I claim as my invention:

1. A method of making maps from aerial photographs by employing templets each corresponding to one of said photographs, each of said templets being provided with a central hole the center of which corresponds to a central reference point on the corresponding photograph and a plurality of angularly disposed slots each of said slots being laterally symmetrical with a radial line through said center and a point corresponding to another point on the corresponding photograph, which method comprises: making index marks on the upper surface of each templet indicating thereon the distance on the corresponding photograph between two reference points; interlocking said templets in overlapping relation by interlocking members passing through said holes and said slots; determining on the upper surface of each of said templets the distance between the centers of the interlocking members corresponding to said two points; and comparing the last named distance with said indicated distance to obtain a correction factor for the corresponding photograph.

2. A method of making maps from aerial photographs by employing templets each corresponding to one of said photographs and each having a central reference point representing a central reference point of the corresponding photograph, which method comprises: marking on each of said templets a plurality of outlying reference points corresponding to outlying points on the corresponding photograph; cutting slots in said templet radially of said central reference point and laterally symmetrical to said outlying reference points, thereby removing the templet material on which said outlying reference points are marked; making an index mark on the upper surface of said templet adjacent at least one of said slots to indicate the radial distance of the corresponding outlying reference point on the material removed in forming the slot; providing a scale of radial distances on the upper surface of said templet along the slot corresponding to said index mark; and comparing the positions with reference to said scale of said index mark and the interlocking member in the corresponding slot to obtain the correction factor for the corresponding photograph.

3. A method of making maps from aerial photographs by employing templets each corresponding to one of said photographs and each having a central reference point representing a central reference point of the corresponding photograph, which method comprises: marking on each of said templets a plurality of outlying reference points corresponding to outlying points on the corresponding photograph; cutting slots in said templet radially of said central reference point and laterally symmetrical of said outlying reference points, thereby removing the templet material on which said outlying reference points are marked; making an index mark on the upper surface of said templet adjacent at least one of said slots to indicate the radial distance of the corresponding outlying reference point on the material removed in forming the slot; providing a logarithmic scale of radial distances on the upper surface of said templet along the slot corresponding to said index mark; deriving by inspection of each interlocked templet the logarithms on said scale represented by the positions of the index mark and of the interlocking member; and subtracting one of said logarithms from the other to obtain the logarithm of the correction factor for the corresponding photograph.

4. A method of making maps from aerial photographs by employing templets each corresponding to one of said photographs, each of said templets being provided with a central hole the center of which corresponds to a central reference point on the corresponding photograph, which method comprises: cutting a plurality of angularly disposed slots each laterally symmetrical with a radial line through said center and a point corresponding to another reference point on the corresponding photograph; making an index mark on the upper surface of each templet indicating thereon the distance on the corresponding photograph between said central and said other reference point; interlocking said templets in overlapping relation by interlocking members passing through said holes and slots; determining on the upper surface of each of said templets the distance between the center of the central interlocking member and the center of an interlocking member corresponding to said other reference point; and comparing the last named distance and the indicated distance to obtain a correction factor for the corresponding photograph.

5. A method of making maps from aerial photographs by employing templets each corresponding to one of said photographs, which method comprises: cutting a plurality of angularly disposed slots in said templet, each of said slots being laterally symmetrical with a radial line through a central point corresponding to a central reference point on the corresponding photograph and a point corresponding to another reference point on the corresponding photograph; providing a scale on the upper surface of said templet extending from said point corresponding to said central reference point outwardly adjacent at least one of said slots; making an index mark on the upper surface of each templet indicating on said scale the distance on the corresponding photograph between said central and said other reference point; interlocking said templets by interlocking members passing through said slots; determining from said scale on each of said templets the distance between the central point corresponding to said central reference point and the center of an interlocking member corresponding to said other reference point; and comparing the last named distance and the indicated distance to obtain the correction factor for the corresponding photograph.

6. A method of making maps from aerial photographs by employing templets, each corresponding to one of said photographs, each of said templets being provided with a circular logarithmic scale the center of which corresponds to a central reference point on the corresponding photograph, which method comprises: cutting a plurality of angularly disposed slots each laterally symmetrical with a radial line through said center and a point corresponding to another reference point on the corresponding photograph; making an index mark on the upper surface of each templet indicating on said scale the logarithm of the distance on the corresponding photograph between said central and said other reference point; interlocking said templets in overlapping relation by interlocking members passing through said slots, determining on the upper surface of each of said templets from said scale the logarithm of the distance between the center of said scale and the center of an interlocking member corresponding to said other reference point; comparing said logarithms to obtain the logarithm of a correction factor for the corresponding photograph; and reproducing the corresponding photograph on an enlarged or reduced scale as indicated by said logarithm of said correction factor.

FRANK D. TERPENING.

CERTIFICATE OF CORRECTION.

Patent No. 2,293,416.　　　　　　　　　　　　　　August 18, 1942.

FRANK D. TERPENING.

It is hereby certified that error appears in the printed specification of the above numbered patent requiring correction as follows: Page 1, second column, line 19, after "means" insert --and method--; line 29, for "substraction" read --subtraction--; page 2, second column, line 34, for "spacing" read --spacings--; page 3, second column, line 40, for "noessary" read --necessary--; page 4, first column, line 63, for "indentical" read --identical--; and that the said Letters Patent should be read with this correction therein that the same may conform to the record of the case in the Patent Office.

Signed and sealed this 29th day of September, A. D. 1942.

Henry Van Arsdale,
(Seal)　　　　　　　　　　　　　　　Acting Commissioner of Patents.